(12) United States Patent
Seo et al.

(10) Patent No.: US 9,768,939 B2
(45) Date of Patent: Sep. 19, 2017

(54) SIGNAL TRANSMISSION/RECEPTION METHOD AND APPARATUS THEREFOR

(71) Applicant: LG Electronics Inc., Seoul (KR)

(72) Inventors: Daewon Seo, Anyang-si (KR); Inkwon Seo, Anyang-si (KR); Hanbyul Seo, Anyang-si (KR)

(73) Assignee: LG Electronics Inc., Seoul (KR)

( * ) Notice: Subject to any disclaimer, the term of this patent is extended or adjusted under 35 U.S.C. 154(b) by 64 days.

(21) Appl. No.: 14/405,202

(22) PCT Filed: Apr. 23, 2013

(86) PCT No.: PCT/KR2013/003466
§ 371 (c)(1),
(2) Date: Dec. 3, 2014

(87) PCT Pub. No.: WO2013/191367
PCT Pub. Date: Dec. 27, 2013

(65) Prior Publication Data
US 2015/0131566 A1 May 14, 2015

Related U.S. Application Data

(60) Provisional application No. 61/661,333, filed on Jun. 18, 2012.

(51) Int. Cl.
*H04W 4/00* (2009.01)
*H04L 5/00* (2006.01)
(Continued)

(52) U.S. Cl.
CPC ......... *H04L 5/0062* (2013.01); *H04B 1/3838* (2013.01); *H04L 1/0026* (2013.01);
(Continued)

(58) Field of Classification Search
CPC ... H04L 1/0026; H04L 5/0062; H04L 5/0073; H04W 72/042; H04W 72/048;
(Continued)

(56) References Cited

U.S. PATENT DOCUMENTS

| | | | |
|---|---|---|---|
| 2012/0129540 A1 | 5/2012 | Hakola et al. | |
| 2013/0016666 A1* | 1/2013 | Chen | H04W 72/1231 370/329 |
| 2015/0139004 A1* | 5/2015 | Fodor | H04W 72/082 370/252 |

FOREIGN PATENT DOCUMENTS

| KR | 10-2012-0009772 A | 2/2012 |
|---|---|---|
| WO | 2011-136586 A2 | 11/2011 |

(Continued)

*Primary Examiner* — Kwang B Yao
*Assistant Examiner* — Harun Chowdhury
(74) *Attorney, Agent, or Firm* — Dentons US LLP

(57) ABSTRACT

The present invention relates to a wireless communication system. More particularly, the present invention relates to a method by which a terminal receives a signal in a wireless communication system which supports device-to-device (D2D) communication and an apparatus therefor, the method comprising the steps of: receiving, from a base station, information about a second signal for D2D communication; receiving from the base station, information about a first signal which acts as an interference signal; receiving the second signal along with the first signal from a second terminal; and removing the first signal from the second signal by using the information about the first and the second signal, wherein the information about the second signal includes an indicator for indicating whether the second signal has the same format used in a 3GPP LTE system, and the information about the second signal further includes information about a parameter different from the one that is used in the 3GPP LTE system, if the second signal does not have the same format as used in the 3GPP LTE system.

14 Claims, 10 Drawing Sheets

(51) Int. Cl.
   *H04B 1/3827*   (2015.01)
   *H04W 72/04*   (2009.01)
   *H04W 72/08*   (2009.01)
   *H04W 76/02*   (2009.01)
   *H04L 1/00*   (2006.01)
   H04W 88/06   (2009.01)
   H04W 28/18   (2009.01)
   H04W 92/18   (2009.01)
   H04L 1/16   (2006.01)
   H04L 1/18   (2006.01)

(52) U.S. Cl.
   CPC ....... *H04W 72/042* (2013.01); *H04W 72/082* (2013.01); *H04W 76/023* (2013.01); *H04L 1/1671* (2013.01); *H04L 1/1896* (2013.01); *H04W 28/18* (2013.01); *H04W 88/06* (2013.01); *H04W 92/18* (2013.01)

(58) Field of Classification Search
   CPC . H04W 72/082; H04W 76/023; H04W 28/18; H04W 88/06; H04B 1/3838
   USPC ................ 370/241, 248, 252, 329, 330, 278
   See application file for complete search history.

(56) References Cited

FOREIGN PATENT DOCUMENTS

WO   2012-002711 A2   1/2012
WO   2012-057547 A2   5/2012
WO   WO2013074463   *   5/2013

* cited by examiner

SIGNAL TRANSMISSION/RECEPTION METHOD AND APPARATUS THEREFOR

This Application is a 35 U.S.C. §371 National Stage entry of International Application No. PCT/KR2013/003466, filed Apr. 23, 2013, which claims benefit of Provisional Application No. 61/661,333 filed Jun. 18, 2012, both of which are incorporated by reference in their entirety herein.

TECHNICAL FIELD

The present invention relates to a wireless communication system, and more particularly, to a method of transmitting and receiving a signal in a D2D (device-to-device) system and an apparatus therefor.

BACKGROUND ART

Generally, a device-to-device (hereinafter abbreviated D2D) communication literally means a communication between one electronic device and another electronic device. In a broad sense, the D2D communication may mean a wire/wireless communication between electronic devices or a communication between a human-controllable device and a machine. Recently, the D2D communication may generally indicate a wireless communication between electronic devices performed without human involvement.

In the early 1990's, in which the concept of the D2D communication has been initially introduced, the D2D communication has been recognized as remote control or telematics or the like and derivative markets of the D2D communication were very limitative. Yet, the D2D communication has grown rapidly for past few years and has become the globally noteworthy markets. Specifically, in POS (point of sales) and security related application markets, the D2D communication has considerably influence on such field as fleet management, remote monitoring of machinery and equipment, smart meter for auto-measurement of operating time, consumed heat or electricity quantity on construction machinery equipment and the like. D2D communication in the future will be further utilized for various usages in connection with a small-scale output communication solution such as conventional mobile communication, wireless high-speed internet, Wi-Fi, ZigBee and the like and may lay the foundation of expansion to B2C (business to consumer) markets instead of being confined to B2B (business to business) markets.

In the era of D2D communication, since all machines in which a SIM (subscriber identity module) card is installed are eligible for transmitting and receiving data, a user may remotely manage and control the machines. For instance, a D2D communication technology can be applied to such a wide scope as a vehicle, a truck, a train, a container, a vending machine, a gas tank and the like. Yet, a study on a D2D communication scheme including a base station and D2D user equipments is not entirely satisfactory.

DISCLOSURE OF THE INVENTION

Technical Tasks

One object of the present invention is to provide a method of efficiently transmitting and receiving a signal in a wireless communication system supporting D2D communication and an apparatus therefor.

Another object of the present invention is to provide a method of efficiently controlling inter-signal interference in a system supporting D2D communication and an apparatus therefor.

Technical tasks obtainable from the present invention are non-limited the above-mentioned technical task. And, other unmentioned technical tasks can be clearly understood from the following description by those having ordinary skill in the technical field to which the present invention pertains.

Technical Solution

In an aspect of the present invention, provided herein is a method of receiving a signal by a user equipment in a wireless communication system supporting a device-to-device (D2D) communication, the method includes receiving information on a second signal for the D2D communication from a base station; receiving information on a first signal acting as an interference signal from the base station; receiving the first signal and the second signal from a second user equipment; and eliminating the first signal from the second signal using the information on the first signal and the information on the second signal, wherein the information on the second signal includes an indicator indicating whether the second signal has a format identical to a format used in a $3^{rd}$ generation partnership project (3GPP) long term evolution (LTE) system and wherein if the second signal does not have the format identical to the format used in the 3GPP LTE system, the information on the second signal further includes information on a parameter different from a parameter used in the 3GPP LTE system.

Preferably, when a control signal or a data signal except the second signal is not received in a subframe in which the second signal is received, the second signal may be used as a discovery signal for the D2D communication.

Preferably, the first signal or the second signal may include at least one of a reference signal used for estimating an uplink channel and a reference signal used for demodulating data.

Preferably, the information on the first signal or the information on the second signal may include at least one of bandwidth information, a sequence group number, a base sequence number, a cyclic shift, an antenna port and frequency hopping information.

Preferably, the information on the first signal may be received via radio resource control (RRC) signaling or physical downlink control channel (PDCCH).

Preferably, when the information on the first signal is received via the PDCCH, the information on the first signal may be received via a field indicating a modulation and coding scheme among a downlink control information (DCI) format.

Preferably, the method further includes calculating and transmitting a signal to interference plus noise ratio (SINR) value of the second signal to the base station, wherein when the SINR value is greater than a specific value, the base station may not transmit the information on the first signal.

In another aspect of the present invention, provided herein is a user equipment receiving a signal in a wireless communication system supporting a device-to-device (D2D) communication includes an RF (radio frequency) module and a processor, the processor configured to receive information on a second signal for the D2D communication from a base station, the processor configured to receive information on a first signal acting as an interference signal from the base station, the processor configured to receive the first signal and the second signal from a second user equipment, the processor configured to eliminate the first signal from the second signal using the information on the first signal and the information on the second signal, wherein the information on the second signal includes an indicator indicating whether the second signal has a format identical to a format used in a $3^{rd}$ generation partnership project (3GPP) long term evolution (LTE) system, and wherein when the second signal does not have the format identical to the format used in the 3GPP LTE system, the information on the second signal can further include information on a parameter different from a parameter used in the 3GPP LTE system.

Preferably, when a control signal or a data signal except the second signal is not received in a subframe in which the second signal is received, the second signal may be used as a discovery signal for the D2D communication.

Preferably, the first signal or the second signal may include at least one of a reference signal used for estimating an uplink channel and a reference signal used for demodulating data.

Preferably, the information on the first signal or the information on the second signal may include at least one of bandwidth information, a sequence group number, a base sequence number, a cyclic shift, an antenna port and frequency hopping information.

Preferably, the information on the first signal may be received via radio resource control (RRC) signaling or physical downlink control channel (PDCCH).

Preferably, when the information on the first signal is received via the PDCCH, the information on the first signal may be received via a field indicating a modulation and coding scheme among a downlink control information (DCI) format.

Preferably, the processor is further configured to calculate and transmit an SINR (signal to interference plus noise ratio) value of the second signal to the base station, wherein when the SINR value is greater than a specific value, the base station may not transmit the information on the first signal.

Advantageous Effects

According to the present invention, a signal can be efficiently transmitted and received in a wireless communication system supporting D2D communication. And, inter-signal interference can be efficiently controlled in a wireless communication system supporting D2D communication.

Effects obtainable from the present invention may be non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

BEST MODE

Mode for Invention

Figure 1:
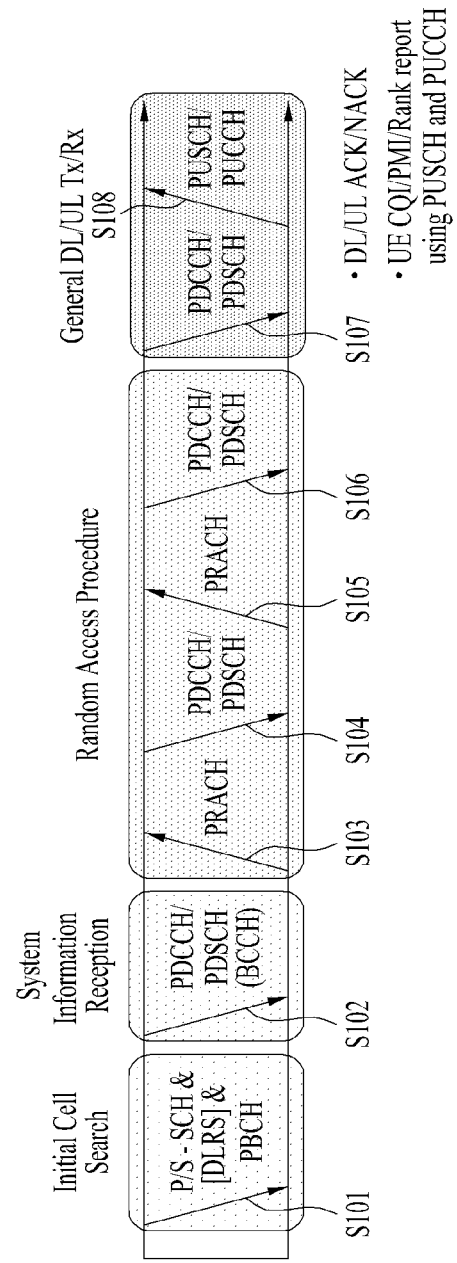
FIG. 1 is a diagram for explaining physical channels used for 3GPP LTE system and a general signal transmission method using the physical channels.

The following embodiments correspond to combinations of elements and features of the present invention in prescribed forms. And, it is able to consider that the respective elements or features are selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment.

In drawings, to prevent the present invention from getting vaguer, procedures and/or steps known to the public are skipped. Procedures and/or steps capable of being understood by a level of those skilled in the art are skipped as well.

In the present specification, embodiments of the present invention are explained centering on a relation of data transmission and reception in a wireless communication system including a base station. In this case, a base station may be meaningful as a terminal node of a network which directly performs communication with a terminal. In this disclosure, a specific operation explained as performed by a base station may be performed by an upper node of the base station in some cases.

In particular, in a network constructed with a plurality of network nodes including a base station, it is apparent that various operations performed for communication with a mobile station can be performed by a base station or other networks except the base station. Moreover, in this document, 'base station (BS)' may be substituted with such a terminology as a fixed station, a Node B, an eNode B (eNB), an advanced base station (ABS), a transmission point, an access point (AP) and the like.

In the present invention, a terminal indicates a terminal becoming a target of transmitting and receiving control information in a wireless communication system according to the present invention and may be simply called a device. In the present specification, 'terminal' may be substituted with such a terminology as a mobile station (MS), a user equipment (UE), a subscriber station (SS), a mobile subscriber station (MSS), a mobile terminal, a terminal or a device.

Embodiments of the present invention may be supported by the disclosed standard documents of at least one of wireless communication systems including IEEE 802 system, 3GPP system, 3GPP LTE (long-term evolution) and LTE-A (LTE-Advanced) system and 3GPP2 system. In particular, the steps or parts, which are not explained to clearly reveal the technical idea of the present invention, in the embodiments of the present invention may be supported by the above documents. Moreover, all terminologies disclosed in this document may be supported by the above standard documents.

The following description of embodiments of the present invention may be usable for various wireless access systems including CDMA (code division multiple access), FDMA (frequency division multiple access), TDMA (time division multiple access), OFDMA (orthogonal frequency division multiple access), SC-FDMA (single carrier frequency division multiple access) and the like. CDMA can be implemented with such a radio technology as UTRA (universal terrestrial radio access), CDMA 2000 and the like. TDMA can be implemented with such a radio technology as GSM/GPRS/EDGE (Global System for Mobile communications/General Packet Radio Service/Enhanced Data Rates for GSM Evolution). OFDMA can be implemented with such a radio technology as IEEE 802.11 (Wi-Fi), IEEE 802.16 (WiMAX), IEEE 802.20, E-UTRA (Evolved UTRA), etc. UTRA is a part of UMTS (Universal Mobile Telecommunications System). 3GPP ($3^{rd}$ Generation Partnership Project) LTE (long term evolution) is a part of E-UMTS (Evolved UMTS) that uses E-UTRA. The 3GPP LTE adopts OFDMA in downlink (hereinafter abbreviated DL) and SC-FDMA in uplink (hereinafter abbreviated UL). And, LTE-A (LTE-Advanced) is an evolved version of 3GPP LTE.

Detailed description disclosed together with the accompanying drawings is intended to explain not a unique embodiment of the present invention but an exemplary embodiment of the present invention.

In the following description, embodiments of the present invention are explained in detail with reference to attached drawings to enable those who skilled in a technical field to which the present invention belongs to easily implement the embodiments of the present invention. Yet, the present invention can be implemented in various different form and may be non-limited by the embodiments of the present invention. In the drawings, to prevent the present invention from getting vaguer, irrelevant parts are skipped. Wherever possible, the same reference numbers will be used throughout the drawings to refer to the same or like parts.

In this disclosure, if a prescribed part "includes" a certain component, it means not to exclude a different component but to further include the different component unless there is a specific opponent comment. Moreover, such terminologies written in the present specification as "unit", "module" and the like indicate a unit processing at least one or more functions or operations and these functions or operations can be implemented by hardware, software or a combination thereof.

Specific terminologies used in the following description are provided to help the understanding of the present invention and can be modified to a different form in a scope of not deviating from the technical idea of the present invention.

In the following, preferred embodiments according to the present invention are explained in detail with reference to attached drawings.

FIG. 1 is a diagram for explaining physical channels used for 3GPP LTE system and a general signal transmission method using the physical channels.

Referring to FIG. 1, if a power of a user equipment is turned on or the user equipment enters a new cell, the user equipment may perform an initial cell search job for matching synchronization with a base station and the like [S101]. To this end, the user equipment may receive a primary synchronization channel (P-SCH) and a secondary synchronization channel (S-SCH) from the base station, may match synchronization with the base station and may then obtain information such as a cell ID and the like. Subsequently, the user equipment may receive a physical broadcast channel from the base station and may be then able to obtain intra-cell broadcast information. Meanwhile, the user equipment may receive a downlink reference signal (DL RS) in the initial cell search step and may be then able to check a DL channel state.

Having completed the initial cell search, the user equipment may receive a physical downlink control channel (PDCCH) and a physical downlink shared control channel (PDSCH) according to the physical downlink control channel (PDCCH) and may be then able to obtain a detailed system information [S102].

Meanwhile, the user equipment may be able to perform a random access procedure to complete the access to the base station [S103 to S106]. To this end, the user equipment may transmit a preamble via a physical random access channel (PRACH) [S103] and may be then able to receive a response message via PDCCH and a corresponding PDSCH in response to the preamble [S104]. In case of a contention based random access, it may be able to perform a contention resolution procedure such as a transmission S105 of an additional physical random access channel and a channel reception S106 of a physical downlink control channel and a corresponding physical downlink shared channel.

Having performed the above mentioned procedures, the user equipment may be able to perform a PDCCH/PDSCH reception S107 and a PUSCH/PUCCH (physical uplink shared channel/physical uplink control channel) transmission S108 as a general uplink/downlink signal transmission procedure. Control information transmitted to a base station by a user equipment may be commonly named uplink control information (hereinafter abbreviated UCI). The UCI may include HARQ-ACK/NACK (Hybrid Automatic Repeat and reQuest Acknowledgement/Negative-ACK), SR (Scheduling Request), CSI (channel state information) and the like. The CSI includes CQI (Channel Quality Indication), PMI (Precoding Matrix Indication), RI (Rank Indication) and the like. The UCI is normally transmitted via PUCCH by periods. Yet, in case that both control information and traffic data need to be simultaneously transmitted, the UCI may be transmitted on PUSCH. Moreover, the UCI may be non-periodically transmitted in response to a request/indication made by a network.

Figure 2:
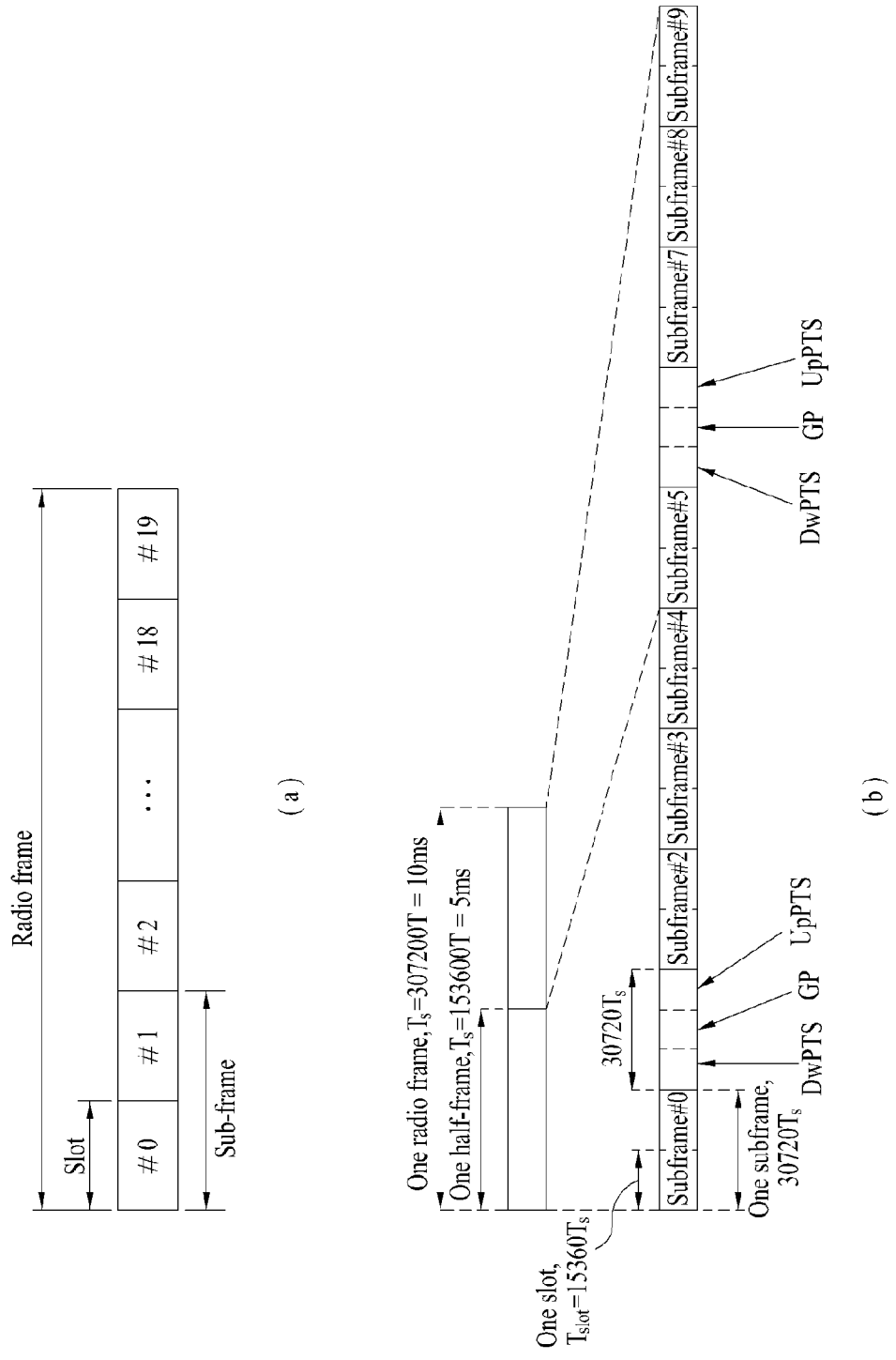
FIGS. 2a and b are diagrams for an example of a radio frame structure.

FIG. 2 is a diagram for an example of a radio frame structure. In a cellular OFDM radio packet communication system, UL/DL (uplink/downlink) data packet transmission is performed by a unit of subframe (SF). And, one subframe is defined as a predetermined time interval including a plurality of OFDM symbols. In 3GPP LTE system, a type 1 radio frame structure applicable to FDD (frequency division duplex) and a type 2 radio frame structure applicable to TDD (time division duplex) are supported.

FIG. 2 (a) is a diagram for a structure of a type 1 radio frame. A DL (downlink) radio frame includes 10 subframes. Each of the subframes includes 2 slots in time domain. And, a time taken to transmit one subframe is defined as a transmission time interval (hereinafter abbreviated TTI). For instance, one subframe may have a length of 1 ms (millisecond) and one slot may have a length of 0.5 ms. One slot may include a plurality of OFDM symbols in time domain and may include a plurality of resource blocks (RBs) in frequency domain. Since 3GPP LTE system uses OFDM in downlink, OFDM symbol is provided to indicate one symbol period. The OFDM symbol may be named SC-FDMA symbol or symbol period. Resource block (RB) is a resource allocation unit and may include a plurality of contiguous subcarriers in one slot.

The number of OFDM symbols included in one slot may vary in accordance with a configuration of CP (cyclic prefix). The CP may be categorized into an extended CP and a normal CP. For instance, in case that OFDM symbols are configured by the normal CP, the number of OFDM symbols included in one slot may correspond to 7. In case that OFDM symbols are configured by the extended CP, since a length of one OFDM symbol increases, the number of OFDM symbols included in one slot may be smaller than that of the case of the normal CP. In case of the extended CP, for instance, the number of OFDM symbols included in one slot may correspond to 6. If a channel status is unstable (e.g., a UE is moving at high speed), it may be able to use the extended CP to further reduce the inter-symbol interference.

When a normal CP is used, since one slot includes 7 OFDM symbols, one subframe includes 14 OFDM symbols. In this case, first 3 OFDM symbols of each subframe may be allocated to PDCCH (physical downlink control channel), while the rest of the OFDM symbols are allocated to PDSCH (physical downlink shared channel).

FIG. 2 (b) is a diagram for a structure of a downlink radio frame of type 2. A type 2 radio frame includes 2 half frames. Each of the half frame includes 5 subframes and includes a DwPTS (downlink pilot time slot), a GP (guard period), and an UpPTS (uplink pilot time slot). Each of the subframes includes 2 slots. The DwPTS is used for initial cell search, synchronization, or channel estimation in a user equipment. The UpPTS is used for channel estimation in a base station and matching an uplink transmission synchronization of a user equipment. The guard period is a period for eliminating interference generated in uplink due to multi-path delay of a downlink signal between uplink and downlink. Table 1 shows an example of UL-DL (uplink-downlink) configuration of subframes in a radio frame in TDD mode.

TABLE 1

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, 'D' indicates a DL subframe (DL SF), 'U' indicates a UL subframe (UL SF) and 'S' indicates a special subframe. The special subframe includes a DwPTS, a GP and a UpPTS. Table 2 shows an example of configuration of the special subframe.

TABLE 2

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | — | — | — |
| 8 | 24144 · $T_s$ | | | — | — | — |

The above-described structures of the radio frame are exemplary only. And, the number of subframes included in a radio frame, the number of slots included in the subframe and the number of symbols included in the slot may be modified in various ways.

Figure 3:
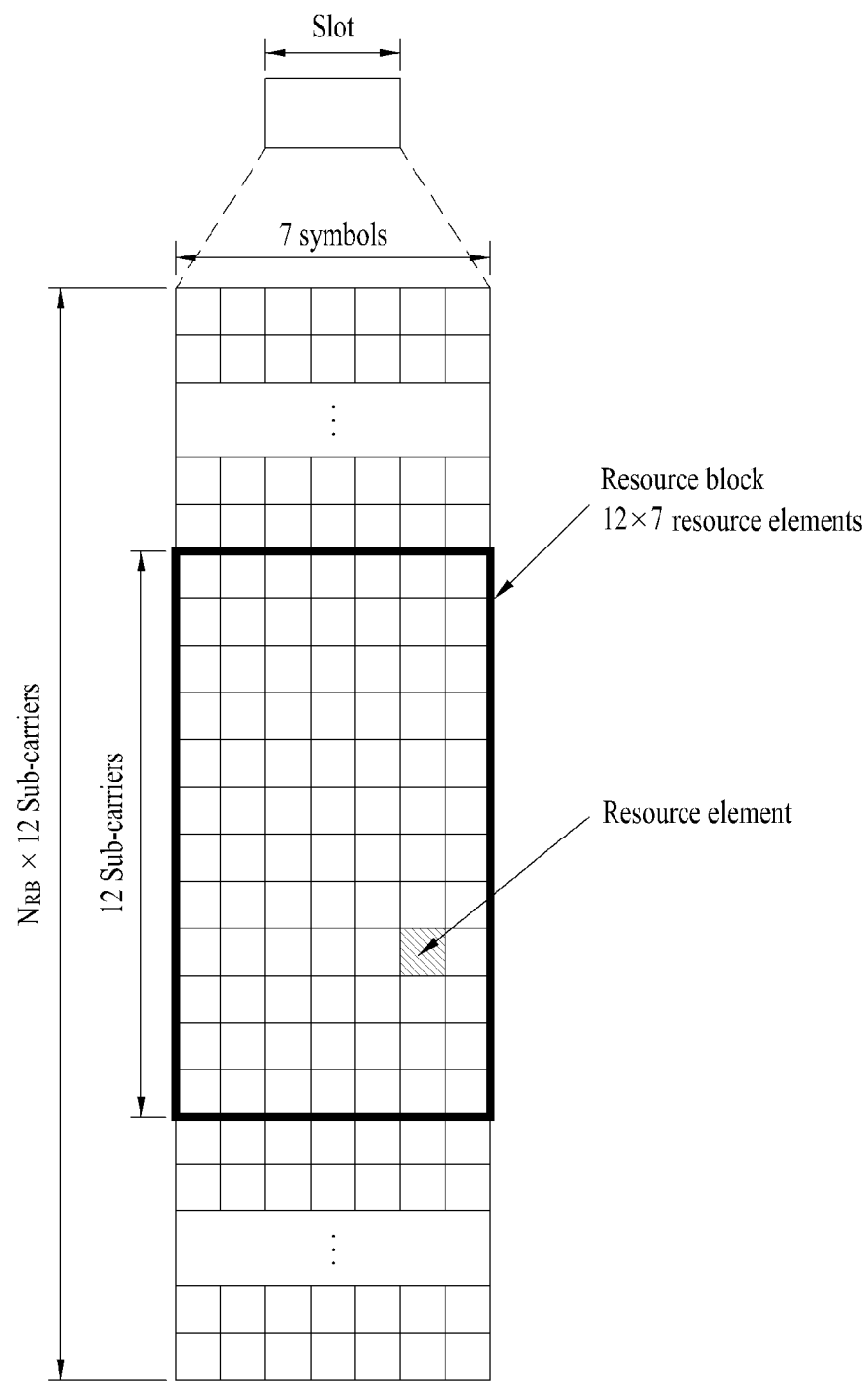
FIG. 3 is a diagram for an example of a resource grid for a downlink slot.

FIG. 3 is a diagram for an example of a resource grid for a downlink slot.

Referring to FIG. 3, one downlink slot includes a plurality of OFDM symbols in time domain. In this case, one downlink (DL) slot includes 7 OFDM symbols and one resource block (RB) includes 12 subcarriers in frequency domain, by which the present invention may be non-limited. Each element on a resource grid is called a resource element (RE). One resource block includes 12×7 resource elements (REs). The number $N_{DL}$ of resource blocks included in a DL slot may depend on a DL transmission bandwidth. And, the structure of an uplink (UL) slot may be identical to that of the DL slot.

Figure 4:
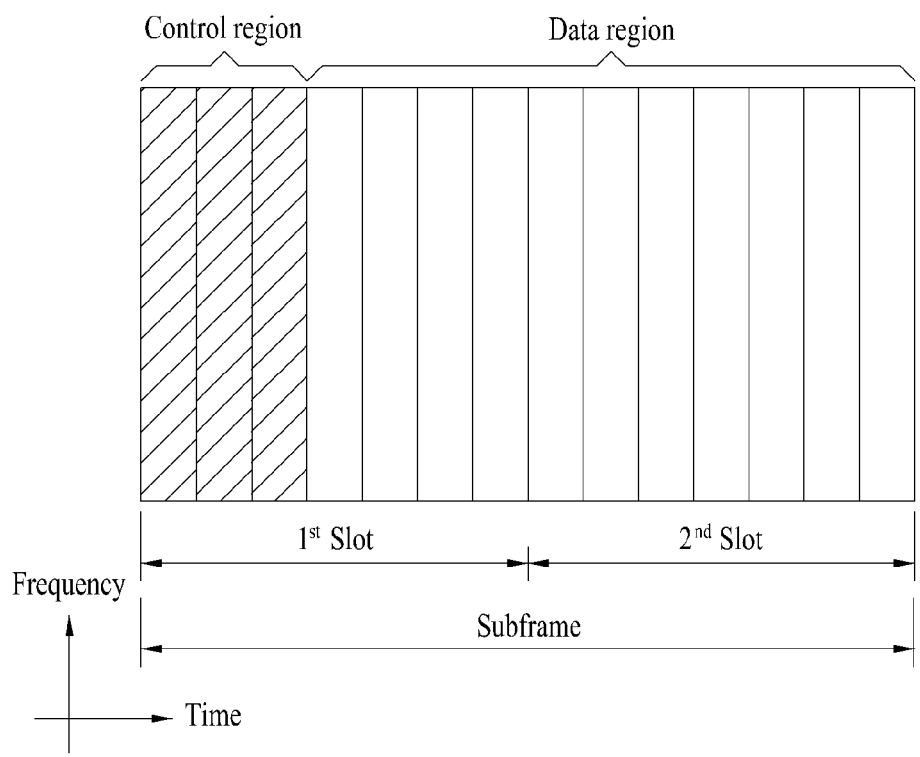
FIG. 4 is a diagram for an example of a structure of a downlink subframe.

FIG. 4 is a diagram for an example of a structure of a downlink subframe.

Referring to FIG. 4, a subframe includes a plurality of (e.g., 2) time domains multiplexed by TDM (time division multiplexing). A first time domain can be used to transmit a control signal. A second time domain can be used to transmit a data signal. For clarity, the first time domain is called a control region and the second time domain is called a data region. Specifically, maximum 3(4) OFDM symbols situated in a head part of a first slot of one subframe correspond to a control region to which control channels are assigned. The rest of OFDM symbols correspond to a data region to which PDSCH (physical downlink shared channel) is assigned. A basic resource unit of the data region corresponds to RB. Examples of DL control channels used by LTE may include PCFICH (Physical Control Format Indicator Channel), PDCCH (Physical Downlink Control Channel), PHICH (Physical hybrid ARQ indicator Channel) and the like. The PCFICH is transmitted in a first OFDM symbol of a subframe and carries information on the number of OFDM symbols used for a transmission of a control channel within the subframe. The PHICH carries HARQ ACK/NACK (acknowledgment/negative-acknowledgment) signal in response to UL transmission. Control information carried on PDCCH may be called downlink control information (hereinafter abbreviated DCI). The DCI includes UL or DL scheduling information or UL transmit power control command for a random UE group.

A DCI format is defined by a format 0, 3, 3A and 4 for UL and a format 1, 1A, 1B, 1C, 1D, 2, 2A, 2B, 2C and the like for DL. A type of information field, the number of information field, the number of bits of each information field and the like vary according to a DCI format. For instance, the DCI format selectively includes such information as hopping flag, RB assignment, MCS (modulation coding scheme), RV (redundancy version), NDI (new data indicator), TPC (transmit power control), HARQ process number, PMI (precoding matrix indicator) confirmation and the like according to a usage of the DCI format. Hence, a size of control information, which is matched to the DCI format, varies according to the DCI format. Meanwhile, a random DCI format can be used to transmit control information of two or more types. For instance, the DCI format 0/1A is used to carry the DCI format 0 or the DCI format 1 and is distinguished from each other by a flag field.

PDCCH is able to carry resource allocation information and transmission format of DL-SCH (downlink shared channel), resource allocation information and transmission format of UL-SCH (uplink shared channel), paging information on PCH (paging channel), system information on DL-SCH, resource allocation information of an upper layer control message such as a random access response transmitted on PDSCH, a set of transmission power control commands for individual user equipments within a random user equipment group, a transmission power control command, activation of VoIP (voice over IP) indication information and the like. A plurality of PDCCHs can be transmitted in a control region and a user equipment is able to monitor a plurality of the PDCCHs. A base station determines a PDCCH format according to a DCI to be transmitted to a user equipment and attaches a CRC (cyclic redundancy check) to control information. CRC is masked with an identifier (e.g., RNTI (radio network temporary identifier)) according to an owner or usage of PDCCH. If the PDCCH is provided for a specific user equipment, the CRC can be masked with a unique identifier of the user equipment, i.e., C-RNTI (i.e., Cell-RNTI). If the PDCCH is provided for a paging message, the CRC can be masked with a paging indication identifier (e.g., P-RNTI (Paging-RNTI)). If the PDCCH is provided for system information (more specifically, for a system information block (SIB)), the CRC can be masked with a system information identifier (e.g., SI-RNTI (system information-RNTI). If the PDCCH is provided for a random access response, CRC can be masked with RA-RNTI (random access-RNTI). PDCCH carries information known as DCI (downlink control information) and the DCI includes resource allocation information and different control information for a UE or a UE group.

Transmission modes used for configuring MIMO technology and information contents of DCI formats are listed in the following.

Transmission Mode (TM)
Transmission mode 1: transmission from a single base station antenna port
Transmission mode 2: transmit diversity
Transmission mode 3: open-loop spatial multiplexing
Transmission mode 4: closed-loop spatial multiplexing
Transmission mode 5: Multi-user MIMO
Transmission mode 6: Closed-loop rank 1 precoding
Transmission mode 7: transmission using UE-specific reference signal DCI Format
Format 0: Resource grants for PUSCH transmissions (uplink)
Format 1: Resource assignments for single codeword PDSCH transmissions (transmission modes 1, 2 and 7)
Format 1A: Compact signaling of resource assignments for single codeword PDSCH (all modes)
Format 1B: Compact resource assignments for PDSCH using rank-1 closed loop precoding (mode 6)
Format 1C: Very compact resource assignments for PDSCH (e.g. paging/broadcast system information)
Format 1D: Compact resource assignments for PDSCH using multi-user MIMO (mode 5)
Format 2: Resource assignments for PDSCH for closed-loop MIMO operation (mode 4)
Format 2A: Resource assignments for PDSCH for open-loop MIMO operation (mode 3)
Format 3/3A: Power control commands for PUCCH and PUSCH with 2-bit/1-bit power adjustment Table 3 shows an example of control information transmitted by DCI format 0. A bit size of each information field is just an example. A bit size of a field may be non-limited by the Table 3.

TABLE 3

| Information field | Bit(s) |
|---|---|
| (1) Flag for distinguishing format 0/format 1A from each other | 1 |
| (2) Hopping flag | 1 |
| (3) Resource block allocation and hopping resource allocation | $\lceil \log_2(N_{RB}^{UL}(N_{RB}^{UL} + 1)/2) \rceil$ |
| (4) Modulation and coding scheme and redundancy version | 5 |
| (5) New data indicator | 1 |
| (6) TPC command for scheduled PUSCH | 2 |
| (7) Cyclic shift for DM RS | 3 |
| (8) UL index (TDD) | 2 |
| (9) CQI request | 1 |

A flag field corresponds to an information field used for distinguishing a format 0 from a format 1A. In particular, the DCI format 0 and the DCI format 1A have an identical payload size and distinguished from each other by the flag field. A resource block allocation field and a hopping resource allocation field may have a different bit size according to hopping PUSCH or non-hopping PUSCH. A resource block allocation field and a hopping resource allocation field for the non-hopping PUSCH provide $\lceil \log_2 (N_{RB}^{UL}(N_{RB}^{UL}+ 1)/2) \rceil$ bit for resource allocation allocated to a first slot of a UL subframe. In this case, $N_{RB}^{UL}$ corresponds to the number of resource blocks included in a UL slot and is determined according to a UL bandwidth configured in a cell. Hence, a payload size of the DCI format 0 may vary according to the UL bandwidth. The DCI format 1A includes an information field for PDSCH assignment. A payload size of the DCI format 1A may also vary according to a DL bandwidth. The DCI format 1A provides the DCI format 0 with a reference information bit size. Hence, if the number of information bits of the DCI format 0 is less than the number of information bits of the DCI format 1A, '0' is added to the DCI format 0 until the payload size of the DCI format 0 becomes identical to the payload size of the DCI format 1A. A padding field of the DCI format is filled with the added '0'.

Figure 5:
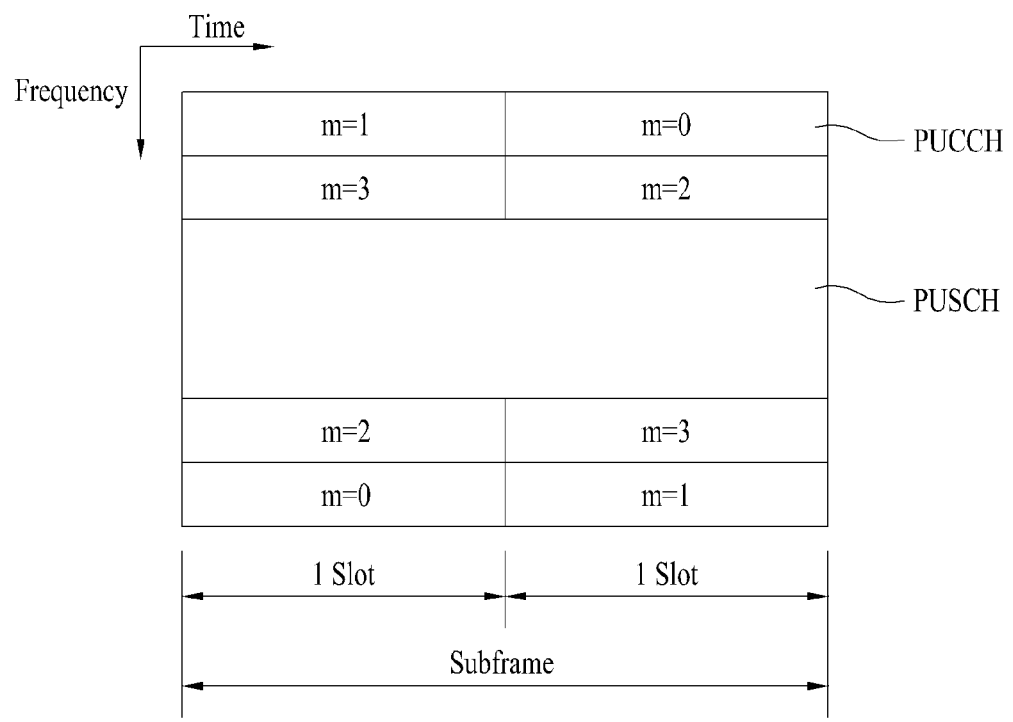
FIG. 5 is a diagram for an example of a structure of an uplink subframe in 3GPP LTE system.

FIG. 5 is a diagram for an example of a structure of an uplink subframe in 3GPP LTE system.

Referring to FIG. 5, an UL subframe includes a plurality of (e.g., 2) slots. A slot may include a different number of SC-FDMA symbols according to a length of a CP. As an example, in case of a normal CP, a slot can include 7 SC-FDMA symbols. An UL subframe can be divided into a data region and a control region in frequency domain. The data region includes PUSCH and is used to transmit a data signal such as audio and the like. The control region includes PUCCH and is used to transmit control information. PUCCH includes an RP pair (e.g., m=0, 1, 2 and 3) situating at both ends of the data region in a frequency axis and hops on a slot boundary. The control information includes HARQ ACK/NACK, CQI (channel quality information), PMI (precoding matrix indicator), RI (rank indication) and the like.

Figure 6:
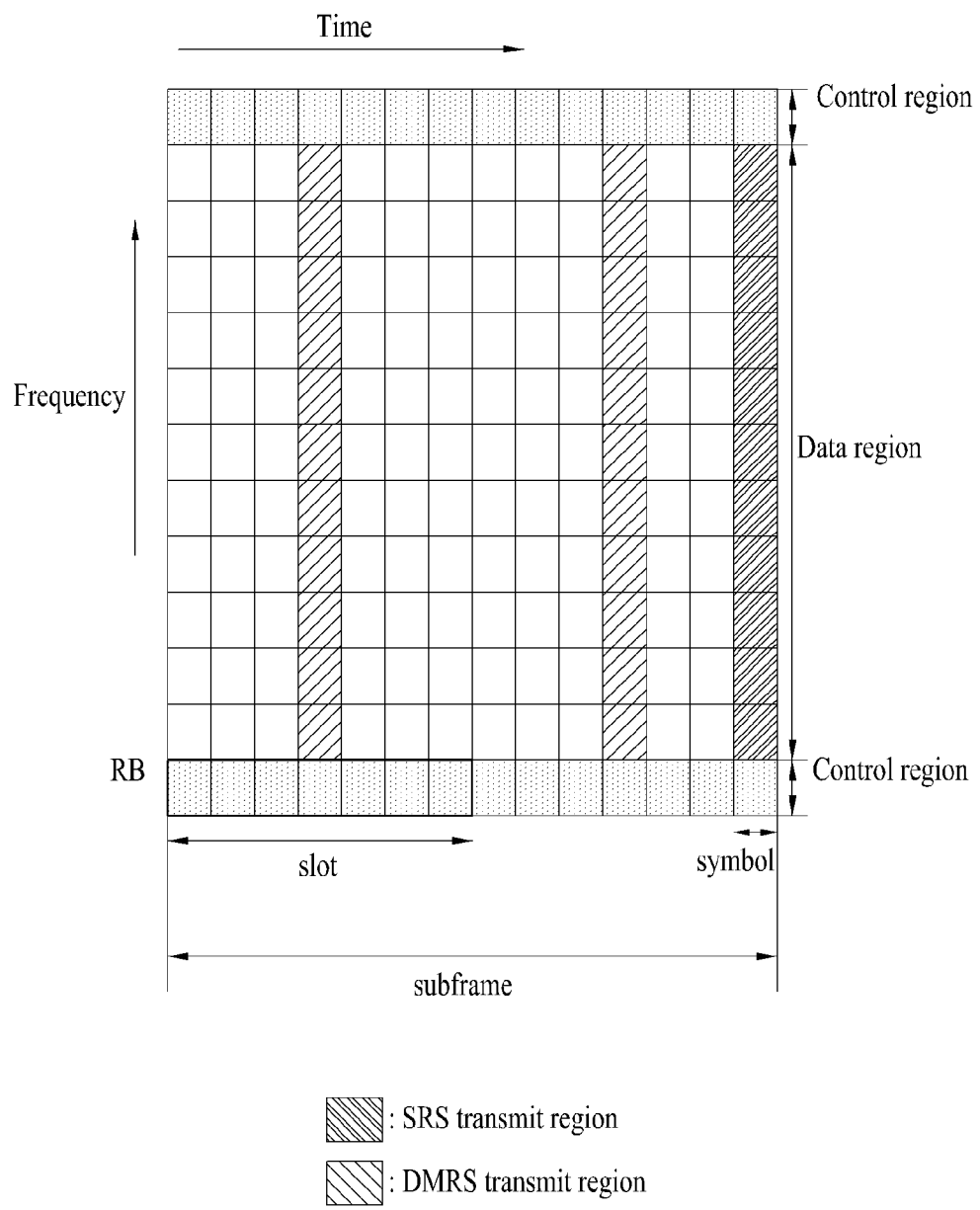
FIG. 6 is a diagram for an example of a reference signal pattern mapped to a downlink resource block (RB) pair defined by LTE system.

FIG. 6 is a diagram for an example of a reference signal used for an uplink subframe in LTE system.

Referring to FIG. 6, a user equipment can periodically or non-periodically transmit an SRS (sounding reference signal) to estimate a channel for an UL band (sub band) except a band on which PUSCH is transmitted or obtain information on a channel corresponding to a whole UL bandwidth (wide band). For instance, a base station can select a modulation and coding scheme used for transmitting uplink data using a sounding reference signal and perform initial power control. And, a base station can perform a frequency selective scheduling to enable frequency resources different from each other to be selectively allocated to each slot using a sounding reference signal. In case of periodically transmitting the SRS, a period can be determined via an upper layer signal. In case of non-periodically transmitting the SRS, a base station can indicate the transmission of the SRS using a 'SRS request' field of an UL-DL DCI format on PDCCH or trigger the transmission of the SRS using a triggering message. As shown in FIG. 6, a region capable of receiving an SRS in a subframe corresponds to a section at which an SC-FDMA symbol, which is located at the last of a time axis in the subframe, is located. SRSs of many user equipments transmitted to the last SC-FDMA of an identical subframe can be distinguished from each other according to a frequency position. Unlike PUSCH, an SRS does not perform DFT (discrete Fourier Transform) calculation used for converting into SC-FDMA and the SRS is transmitted without using a precoding matrix which is used by PUSCH.

A sounding reference signal consists of CAZAC (constant amplitude zero auto correlation) sequence and the like. Sounding reference signals transmitted from many user equipments correspond to a CAZAC sequence including cyclic shift values different from each other. Each of CAZAC sequences, which have occurred from one CAZAC sequence via a cyclic shift, has a characteristic of zero-correlation with sequences including a different cyclic shift value. Sounding reference signals in an identical frequency domain can be distinguished from each other according to a CAZAC sequence cyclic shift value using the above-mentioned characteristic. A sounding reference signal of each user equipment is assigned to a frequency according to a parameter configured by a base station. A user equipment performs frequency hopping of a sounding reference signal to transmit the sounding reference signal to the whole of an uplink data transmission bandwidth. Parameters used for constructing a sounding reference signal can be semi-statically configured via upper layer and may include parameters listed in the following.

Group number for generating CAZAC sequence, base sequence number
physical resource block allocation start point
duration of sounding reference signal
sounding reference signal bandwidth (e.g., system bandwidth, bandwidth assigned to sounding reference signal)
cyclic shift
frequency hopping bandwidth
antenna port number
comb value Moreover, a region to which a DMRS (demodulation reference signal) is transmitted in a subframe corresponds to a section at which an SC-FDMA symbol, which is located at the center of each slot in time axis, is located. Similarly, the DMRS is transmitted via a data transmission band on frequency axis. For instance, the DMRS is transmitted in a $4^{th}$ SC-FDMA symbol and an $11^{th}$ SC-FDMA symbol in a subframe to which a normal cyclic prefix is applied.

A DMRS can be combined with transmission of PUSCH or PUCCH. An SRS is a reference signal transmitted to a base station by a user equipment for UL scheduling. The base station estimates an UL channel using the received SRS and uses the estimated UL channel for the UL scheduling. The SRS is not combined with the transmission of PUSCH or PUCCH. A basic sequence of an identical type can be used for the DMRS and the SRS. Meanwhile, in case of performing UL multi-antenna transmission, a precoding applied to a DMRS may be identical to a precoding applied to PUSCH. Parameters used for constructing a DMRS can be semi-statically configured via upper layer and may include parameters listed in the following.

group number for generating CAZAC sequence, base sequence number
physical resource block allocation start point
demodulation reference signal bandwidth
cyclic shift
antenna port number A reference signal used in LTE system includes 30 sequence groups. A specific sequence group of a reference signal to be used in each cell is determined by 17 group hopping patterns and 30 sequence hopping patterns. Hence, a sequence group and 504 cell IDs may have one-to-one relationship. By doing so, cell planning can be easily performed and cell interference can be minimized. A group hopping pattern indicates a pattern using sequence groups different from each other for each slot. A sequence hopping pattern indicates a pattern using sequences different from each other for each slot.

Figure 7:
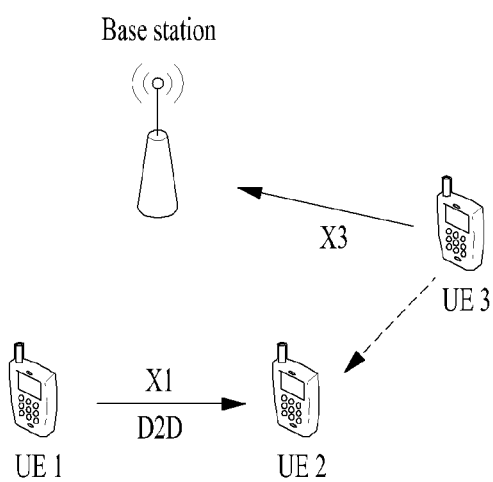
FIG. 7 is a diagram for an example of inter-signal interference within a cell in a D2D (device-to-device) communication system.

FIG. 7 is a diagram for an example of a D2D (device-to-device) communication system. Although the present invention is explained on the basis of one-to-one D2D communication link shown in FIG. 7, the present invention can also be applied to one-to-many D2D communication link, many-to-one D2D communication link or a situation in which a cellular communication link and a D2D communication link are mixed. In the present specification, unlike a legacy communication scheme transceiving a signal between user equipments via a base station, a D2D communication indicates a communication scheme that user equipments exchange a signal with each other via a direct link between the user equipments.

Referring to FIG. 7, there are two UEs (UE1 and UE2) supporting D2D communication. The UEs (UE1 and UE2) form a D2D communication pair and the UE1 can transmit a D2D signal (X1) to the UE2 for D2D communication. For instance, the UE1 can transmit a predetermined discovery signal to the UE2 to inform the UE2 of existence of the UE1 as a D2D UE. As an example, an SRS (sounding reference signal) used in a legacy LTE system can be used as a discovery signal. As a different example, a DMRS (demodulation reference signal) used in a legacy LTE system can be used as a discovery signal. For clarity, an SRS and a DMRS, which are used as a discovery signal in a D2D communication system, are called a D2D SRS and a D2D DMRS, respectively. Compared to an SRS and a DMRS used in LTE system, the D2D SRS and the D2D DMRS may have a different characteristic in accordance with D2D communication.

A base station can control not only operation of UEs (e.g., UE1 and UE2) performing D2D communication but also operation of a different UE (e.g., UE3) performing communication with the base station. For instance, the base station can schedule a type of a signal transceived between the UEs (UE1 and UE2) performing the D2D communication and a resource for the same. And, the base station can schedule a type of a signal transceived between a general UE (e.g., UE3) and the base station and a resource for the same. Hence, since the base station knows a scheduling relation between a signal and a resource of each of the UEs, the base station is able to know where interference occurs between signals. Moreover, the base station is able to identify a schematic location of each UE via GPS (global positioning system) installed in the UEs or a location identification technology. Hence, the base station is able to know whether adjacent UEs cause interference on the D2D UEs.

A UE3 is a terminal not performing D2D communication. The UE3 may be located at a cell identical to a cell at which the D2D UEs (UE1 and UE2) are located or a different cell adjacent to the cell at which the D2D UEs are located. The UE3 can communicate with the base station in a manner of being independent of the UEs (UE1 and UE2) performing the D2D communication. To this end, the UE3 can transmit a signal (X3) to the base station. For instance, the UE3 can transmit an SRS to the base station for channel state estimation or synchronization performed by the base station. As a different example, the UE3 can transmit a DMRS to the base station for data demodulation performed by the base station. For clarity, an SRS and a DMRS used in LTE system for an original purpose are named an LTE SRS and an LTE DMRS, respectively.

In this case, the signal (X3) transmitted by the UE3 is overlapped with a signal (X1) between the UEs (UE1 and UE2) performing D2D communication and may cause interference. For instance, if the UE3 transmits a D2D SRS or a D2D DMRS for a separate D2D communication, it may cause interference on an SRS (or D2D SRS) or a DMRS (or D2D DMRS) used for the D2D communication between the adjacent D2D UEs (UE1 and UE2). In this case, since the signal (X3) transmitted by the UE3 is locally used in a manner of being power-controlled by the base station, impact on the communication performed between the D2D UEs (UE1 and UE2) can be controlled below a certain level. As a different example, if the UE3 transmits an LTE SRS or an LTE DMRS for an usage of an uplink RS, since the LTE SRS or the LTE DMRS is transmitted by high transmit power, the LTE SRS or the LTE DMRS may act a big interference on a D2D discovery signal (X1) received by the UE2. Hence, if interference occurs between the D2D signal received by the UE2 and the signal (X3) transmitted by the UE3, D2D communication performance (between the UE1 and the UE2) can be degraded. Hence, in performing a D2D operation, if a D2D signal is interfered by a signal of a different adjacent node, the present invention proposes a method for a base station to inform D2D UEs of interference signal information used for offsetting the interference to eliminate or mitigate the interference.

Figure 8:
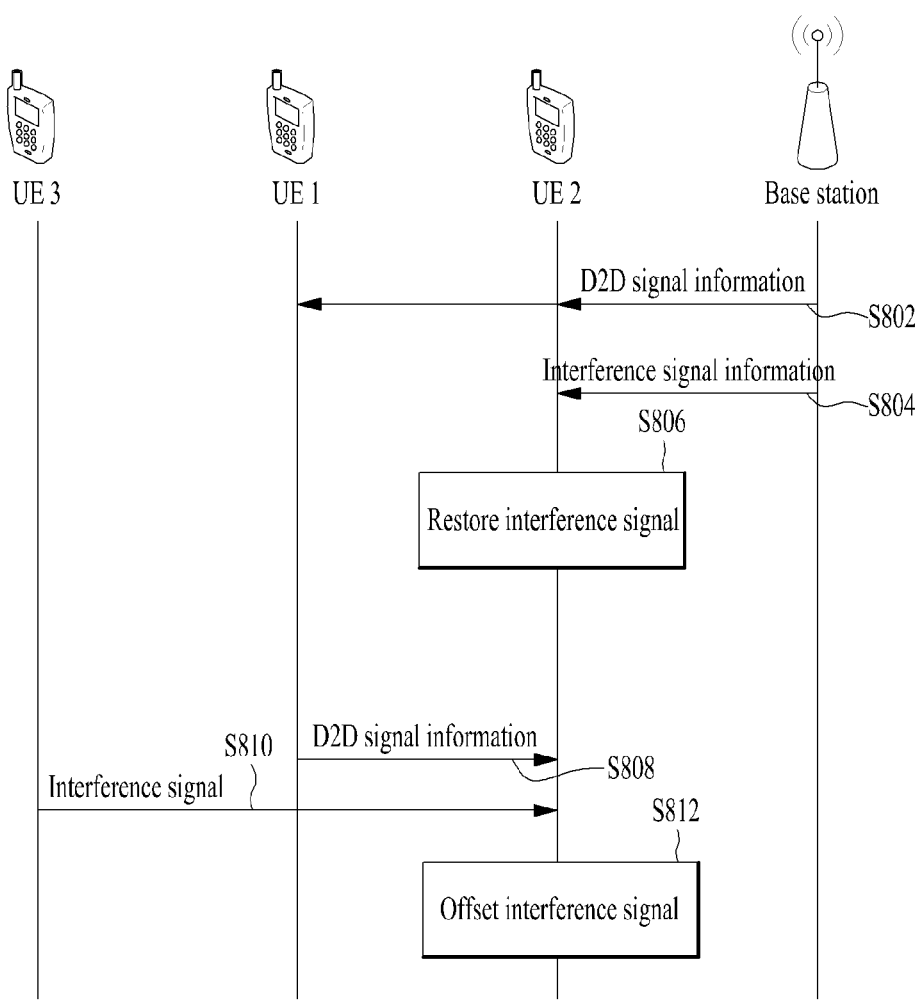
FIG. 8 is a flowchart for an example of a method of eliminating an interference signal from a D2D signal according to the present invention.

FIG. 8 is a flowchart for an example of a method of eliminating an interference signal from a D2D signal according to the present invention.

Referring to FIG. 8, similar to FIG. 7, D2D communication is performed between a UE1 and a UE2 and a UE3 transmits a separate signal to a base station or a different UE. The base station can transmit information on a signal for the D2D communication to D2D UEs (e.g., UE1 and UE2) [S802]. The information may correspond to information on a discovery signal used for finding out a D2D UE. Or, the information may correspond to scheduling information used for performing the D2D communication.

The base station can control not only operations of the D2D UEs (e.g., UE1 and UE2) but also an operation of a general UE (e.g., UE3). Moreover, the base station can identify schematic locations of the UEs. Hence, the base station can inform a D2D UE (e.g., UE2) of interference signal-related information, which is necessary for eliminating interference, to offset impact of an interference signal [S804]. The interference signal-related information can be informed in advance or can be informed on timing identical to timing of the interference signal. For instance, the base station can inform the D2D UE of the interference signal-related information in a subframe capable of receiving the interference signal. In case that the base station informs the D2D UEs of the interference signal-related information in advance, the base station can inform the D2D UEs of the interference signal-related information as soon as possible before interference caused by the interference signal occurs. For instance, the base station can inform the D2D UEs of the interference signal-related information in a subframe corresponding to timing on which the base station has anticipated that interference is to occur in a specific subframe in the time of scheduling or via upper layer signaling. Although FIG. 8 shows a case that the interference signal information is transmitted to the D2D UE in advance, if the interference signal information is transmitted on timing identical to timing of the interference signal, the step S804 and the step S808 can be performed on an identical timing.

The D2D UE (e.g., UE2) receives the interference signal-related information from the base station in advance (e.g., timing as soon as possible) and can restore the interference signal using the information [S806]. Restoring the interference signal can be performed immediately after the interference signal-related information is received or can be performed when the interference signal is offset [S812]. And, if the D2D UE (e.g., UE2) receives the interference signal-related information and the interference signal at the same time, restoring the interference signal and offsetting the interference signal [S812] can be performed at the same time.

A D2D UE (e.g., UE1) can transmit a D2D signal to the different D2D UE (e.g., UE2) using the D2D signal information received in the step S802 [S808]. The D2D signal

[S802] may correspond to a discovery signal configured to inform existence of the D2D UE. Or, the D2D signal [S802] may correspond to a control signal or a data signal for the D2D communication.

A different UE (e.g., UE3) can transmit an interference signal causing interference on the D2D signal on timing identical to the timing on which the D2D signal is transmitted in the step S808 [S810]. The interference signal may correspond to a signal including a property identical or similar to the D2D signal. For instance, if the D2D signal corresponds to an SRS used as a discovery signal, an SRS transmitted by the UE3 may correspond to an interference signal. As a different example, if the D2D signal corresponds to a DMRS used as a discovery signal, a DMRS transmitted by the UE3 may correspond to an interference signal.

The D2D UE (e.g., UE2) eliminates (e.g., subtraction) the restored interference signal from the received D2D signal and can eliminate all or a part of the interference signal [S812].

The aforementioned interference offsetting method is advantageous when an original interference signal is able to be restored by a partial parameter of a signal only. Hence, the method can be advantageous when the method is used to offset interference of a predictable signal (e.g., reference signal). Hence, following description mainly concerns a case that a D2D signal corresponds to a specific reference signal such as an SRS or a DMRS. Yet, the present invention can also be identically applied to a case that the D2D signal corresponds to a control signal or a data signal.

Embodiments described in the following may configure a new embodiment in a manner of being combined with each other. Each of the embodiments can be implemented in a manner of excluding a part of configuration from each of the embodiments.

Embodiment 1

A D2D SRS, which is used as a D2D discovery signal, may correspond to a signal identical to an SRS (LTE SRS) used in LTE system or a signal to which a partial characteristic is restricted or added compared to an LTE SRS. For instance, compared to the LTE SRS, the D2D SRS may have a different group hopping pattern or a sequence hopping pattern. Or, for instance, the D2D SRS may have a different SRS bandwidth compared to the LTE SRS. A base station can transmit information on an SRS, which is used as a D2D discovery signal, to D2D UEs (e.g., UE1 and UE2).

Information on a D2D discovery signal can include a format indicator indicating whether an SRS, which is used as the D2D discovery signal, has a configuration different from that of an SRS (LTE SRS) used in a legacy LTE. If the SRS used as the D2D discovery signal has a configuration different from a configuration of the LTE SRS, the information on the D2D discovery signal can include information on a parameter, which is differently configured compared to the LTE SRS. Or, if the SRS used as the D2D discovery signal has a configuration different from a configuration of the LTE SRS, the information on the D2D discovery signal can include information on both the format indicator and the differently configured parameter. For instance, if an SRS format indicator indicates that the D2D SRS used as the D2D discovery signal has a configuration different from a configuration of the LTE SRS and the D2D SRS used as the D2D discovery signal has an SRS bandwidth different from that of the LTE SRS, the base station can transmit bandwidth information used by the D2D SRS to the D2D UEs (e.g., UE1 and UE2). For instance, the information on the parameter can include a group number, which is progression information of the D2D SRS, a base sequence number, a bandwidth on which an SRS (interference signal) is transmitted (e.g., a system bandwidth, a bandwidth assigned to an interference signal), cyclic shift, frequency hopping, antenna port number, comb value and the like.

If an SRS used as a D2D discovery signal has a configuration identical to a configuration of an LTE SRS, information on the D2D discovery signal can include a format indicator only. Configuration information on the LTE SRS can be informed to D2D UEs via upper layer (e.g., RRC) signaling.

If it is determined that an SRS (or D2D SRS) transmitted by an adjacent UE (e.g., UE3) causes interference on a D2D UE (e.g., UE2), a base station can transmit information on the SRS (or D2D SRS) acting as an interference signal to the D2D UE (e.g., UE2). In this case, the SRS acting as the interference signal may have a configuration identical to a configuration of an LTE SRS or may have a partial configuration different from the configuration of the LTE SRS. Similarly, the base station can transmit the information on the SRS acting as the interference signal to the D2D UE (e.g., UE2). Information on the interference signal can include a format indicator indicating whether the SRS acting as the interference signal has a configuration different from a configuration of an SRS (LTE SRS) used in a legacy LTE. If the format indicator indicates that the SRS used as the D2D discovery signal has a configuration different from a configuration of the LTE SRS, the information on the interference signal can include information on a differently configured parameter compared to the LTE SRS. The information on the parameter can include a group number, which is progression information of the D2D SRS used as the interference signal, a base sequence number, a bandwidth on which an SRS (interference signal) is transmitted (e.g., a system bandwidth, a bandwidth assigned to an interference signal), cyclic shift, frequency hopping, antenna port number, comb value and the like.

Since the base station knows both the information on the interference signal and the information on the D2D discovery signal, the base station can semi-statically inform the D2D UEs of the informations via upper layer signaling (e.g., RRC signaling) or can dynamically inform the D2D UEs of the informations via a downlink grant (e.g., PDCCH). For instance, if an SRS acting as an interference signal is periodically transmitted, it would be better to inform the D2D UEs of the informations via upper layer signaling. If the SRS acting as the interference signal is aperiodically transmitted, it would be better to inform the D2D UEs of the information via an uplink or a downlink grant. And, the base station can inform the D2D UEs of the information on the interference signal in advance (or on timing as soon as possible). Or, the base station can inform the D2D UEs of the information on the interference signal on timing identical to timing of the interference signal.

The D2D UE (e.g., UE2) restores an SRS interference signal (e.g., X3 in FIG. 7) based on the information on the interference signal received from the base station and estimates a transmission sequence and a transmission bandwidth. And then, the D2D UE can offset or mitigate interference impact by eliminating the estimated interference signal from a received D2D discovery signal. For instance, if the format indicator included in the information on the received interference signal indicates that the SRS used as the interference signal has a configuration different from a configuration of the LTE SRS and the information on the interference signal includes information on a bandwidth different from a bandwidth of the LTE SRS, the D2D UE (e.g., UE2) receiving the D2D discovery signal can offset interference in a bandwidth on which the SRS acting as the interference signal is transmitted only using the information on the interference signal.

Embodiment 2

As mentioned in the foregoing description, a DMRS is transmitted on a physical channel (PUSCH, PUCCH and the like) in a legacy LTE system and is used to demodulate data. Yet, the DMRS can also be used as a D2D discovery signal. For instance, when a D2D UE (e.g., UE2) receives a specific resource block, the D2D UE is able to recognize that there is no control information (e.g., PUCCH) or data (e.g., PUSCH) except the DMRS in the specific resource block via power detection or a different specific means. In this case, the D2D UE (e.g., UE2) can recognize the DMRS as a D2D discovery signal. Or, for instance, the D2D UE (e.g., UE2) may receive an indication indicating that a DMRS of a specific frequency/time domain corresponds to a DMRS used as a D2D discovery signal from a base station. In this case, the D2D UE (e.g., UE2) can recognize a DMRS received in a corresponding region as a D2D discovery signal. In this case, it is not necessary for the DMRS to exist in the corresponding region only. For instance, if uplink data is included in the corresponding region, a base station can demodulate a PUCCH or a PUSCH signal using the DMRS.

If a DMRS is used as a discovery signal, a DMRS of a different UE may cause interference. In this case, since a base station knows information on the DMRS acting as an interference signal, the base station can inform a D2D UE (e.g., UE2) of the information on the interference signal. The information on the interference signal can include a bandwidth (and/or start point), a sequence group number, a base sequence number, cyclic shift, an antenna port and the like. The information on the interference signal can be semi-statically transmitted via upper layer signaling (e.g., RRC signaling) or can be dynamically transmitted via a downlink grant or an uplink grant (e.g., PDCCH). Since a DMRS has no periodicity, it would be better to dynamically transmit the DMRS via PDCCH for example.

The D2D UE (e.g., UE2) can estimate the DMRS acting as the interference signal using the information on the interference signal received from the base station and restore the DMRS. The D2D UE (e.g., UE2) can offset the interference using the restored DMRS.

As an example, referring to FIG. 7, a DMRS configuration of UE1 and a DMRS configuration of UE3 may be identical to each other except a cyclic shift. In this case, the DMRSs may use an identical sequence hopping pattern and may have an identical cell ID. A base station can inform the UE 2 that the DMRS from the UE3 may act as an interference signal and the DMRS (X3) of the UE3 is identical to the DMRS (X1) of the UE1 except the cyclic shift. Or, the base station may inform the UE2 of a cyclic shift value of the DMRS (X3) of the UE3 via a partial field (e.g., MCS field), which is not used among UL grant DCI format. Or, the base station may add a specific field used for D2D communication to the UL grant DCI format and may be then able to inform the UE2 of the cyclic shift value of the DMRS (X3) of the UE3 via the added field. By doing so, the UE2 can restore the DMRS (X3) of the UE3. If a partial field of a legacy UL grant DCI format is used or a specific field is added, the DCI format can be masked with an identifier (e.g., D2D-RNTI) for D2D. The UE2 compares the restored DMRS with 8 DMRSs capable of being used in a corresponding time/frequency resource and selects a DMRS matched with the DMRS (X3) transmitted from the UE3. By doing so, the UE2 can offset the interference from the UE3.

As a different example, D2D UEs disable UE-specific parameters among parameters of a DMRS sequence generated for D2D communication to reduce amount of information that a base station should inform. For instance, in case of a UE-specifically determined group hopping pattern, if the D2D UEs disable the group hopping pattern, the amount of information informed by the base station can be reduced. And, for instance, if RB allocation of a DMRS of which a D2D UE wants to receive and RB allocation of a DMRS acting as an interference signal are identical to each other, a DMRS sequence may be cell-specific. Hence, the D2D UE (e.g., UE2) can offset interference of a DMRS using cyclic shift information only. Or, the D2D UE attempts to detect an available cyclic shift and may be then able to offset interference of a DMRS using the detected cyclic shift.

In the aforementioned first and second embodiment, in case of using an SRS or a DMRS as a discovery signal, an example of a method of offsetting interference is explained. Yet, a signal causing interference in D2D communication is not limited to a signal (e.g., SRS, DMRS) used in a legacy LTE system only. For instance, interference may occur between newly defined signals. Or, for instance, interference may occur between such a signal used in a legacy system as an SRS and a newly defined signal. And, various interference may occur at the same time and it may be necessary to receive parameter information of various interference signals to offset the various signals causing interference. In this case, a base station may inform a D2D UE (e.g., UE2) of not only the parameter information of the interference signals but also an indicator used for distinguishing types of the interference signals from each other.

And, interference may occur in a partial resource only in a manner that various signals are duplicate assigned to the partial resource instead of being precisely assigned to an identical resource. In this case, a base station can inform a D2D UE (e.g., UE2) of information on a whole bandwidth and location information of the resource to which various signals are duplicate assigned. And, if a D2D signal and a signal causing interference are different from each other in a partial parameter only, it is not necessary to transmit all parameters. Overhead can be reduced by transmitting a partial parameter only. For instance, if a signal (e.g., SRS) transmitted by a D2D UE (e.g., UE1) and an interference signal (e.g., SRS) transmitted by a different UE (e.g., UE3) are different from each other in a cyclic shift only, a base station can transmit information on the cyclic shift to a D2D UE (e.g., UE2) only.

And, a base station can explicitly indicate various types of interference, which are capable of being occurred when a D2D signal is received, to a UE. Or, the base station groups all interference capable of being occurred and may be then able to inform a UE of a group to which an interference signal belongs. For instance, 8 cyclic shifts are grouped by 2 groups each of which includes 4 cyclic shifts and a base station can inform a UE of a group to which an interference signal belongs among the two groups. In this case, a D2D UE (e.g., UE2) performs blind detection on 4 cyclic shifts belonging to the group indicated by the base station and may be then able to detect an interference signal.

A base station can inform a D2D UE (e.g., UE2) of information via a field not used in UL grant DCI or a field (e.g., MCS field, RA field), which is fine although information size of the field is reduced. Since a D2D signal is mainly transmitted via a UL subframe and the D2D signal has a limited freedom in terms of resource/power compared to a signal transceived with a base station in a legacy LTE system, it would be better to use an MCS field or an RA field of a UL grant. Or, a partial bit can be used instead of the MCS or the RA field in a manner of defining an available field among DCI format in advance. D2D transmission can be performed via a UL channel. Yet, it is not limited to the UL channel. Hence, a different means except the UL grant can also be used to transmit information on an interference signal.

In the foregoing description, it is explained as a base station spontaneously (self-triggering) transmits information used for offsetting interference to UEs without separately receiving a request from the UEs. Yet, a D2D UE (e.g., UE2) may request the information used for offsetting interference. For instance, the D2D UE (e.g., UE2) can determine whether interference offset is required based on an SINR (signal to interference plus noise ratio) value of a received signal. For instance, if the SINR value of the received signal is less than a prescribed level, the D2D UE (e.g., UE2) can determine it as the interference offset is required. As a different example, if the SINR value of the received signal is greater than the prescribed level, the D2D UE (e.g., UE2) can determine it as the interference offset is not required. If it is determined that the interference offset is required, the D2D UE (e.g., UE2) can request information necessary for performing the interference offset to a base station. Or, the D2D UE (e.g., UE2) reports an SINR value of a received signal to the base station and the base station can determine whether interference offset is required. For instance, if the SINR value of the received signal is less than the prescribed level, the base station can determine it as the interference offset is required. As a different example, if the SINR value of the received signal is greater than the prescribed level, the base station can determine it as the interference offset is not required. Or, in case of transmitting interference offset information, the base station selects one of two modes including a mode of spontaneously transmitting (self-triggering) the interference offset information and a mode of transmitting the interference offset information by a request of a UE (UE triggering) and may be able to inform the D2D UE (e.g., UE2) of the selected mode via upper layer signaling (e.g., RRC signaling). Or, the D2D UE (e.g., UE2) selects one of the spontaneous transmission mode and the transmission mode requested by the UE and may then be able to inform the base station of the selected mode via upper layer signaling (e.g., RRC signaling). By doing so, the base station can transmit information on an interference signal in the vicinity of a D2D reception UE (e.g., UE2) based on location information of each UE.

Figure 9:
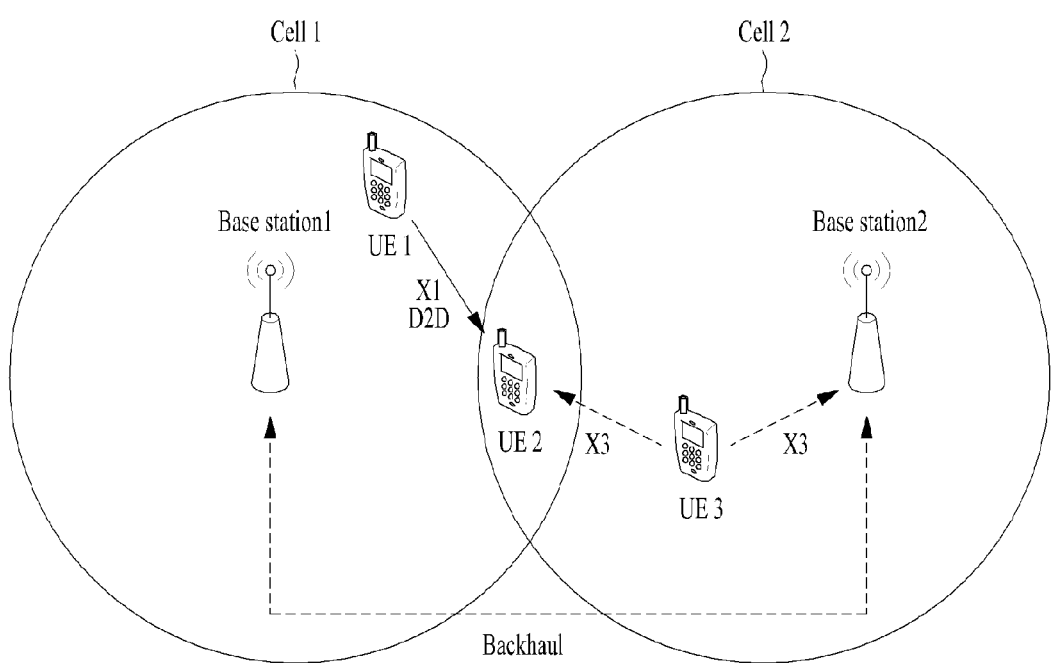
FIG. 9 is a diagram for an example of interference occurring between cells different from each other.

FIG. 9 is a diagram for an example of interference occurring between cells different from each other. In case that interference occurs between cells different from each other, the aforementioned principle can also be identically applied to offset the interference.

Referring to FIG. 9, D2D communication is performed between D2D UEs (e.g., UE1 and UE2) in a first cell (e.g., cell 1). Since the UE2 is located at a boundary of the cell 1, the UE2 may receive interference impact from a signal (e.g., X3) of a UE (e.g., UE3) belonging to a second cell (e.g., cell 2). In this case, interference from a neighbor cell (e.g., cell 2) can be offset according to the embodiment of the present invention. For instance, a base station 1 and a base station 2 can share location information of UEs (e.g., UE1, UE2 and UE3) and scheduling information with each other via a backhaul network. Hence, the base station 1 can anticipate the interference of the UE3 and can receive information used for offsetting the interference from the base station 2 in real time via the backhaul network. The base station 1 can inform a D2D UE (e.g., UE2) of the received interference information of the neighbor cell (e.g., cell 2).

A method of informing a D2D UE of interference signal information received from a neighbor cell may follow a method of transmitting an interference signal used for offsetting intra-cell interference. Yet, in case of offsetting inter-cell interference, it is necessary to additionally receive a system bandwidth of the neighbor cell and a bandwidth assigned to a UE (e.g., UE3) transmitting an interference signal. And, in case of offsetting inter-cell interference, since parameters, which generate an SRS or a DMRS sequence, vary according to a cell ID, the number of parameters transmitted to a D2D UE (e.g., UE2) by a base station (e.g., base station 1) may increase.

In case of D2D communication, in order to prevent the number of parameters from being increased according to a cell ID, an ID of a current cell and an ID of a neighbor cell can be unified via upper layer signaling (e.g., RRC signaling). In this case, a D2D UE (e.g., UE2) located at a cell boundary may have two cell IDs. For instance, in case of transmitting and receiving a signal according to an LTE system, it is able to communicate with a base station using a cell ID of a current cell. In case of transmitting and receiving a D2D signal, D2D communication can be performed using a newly received cell ID.

Figure 10:
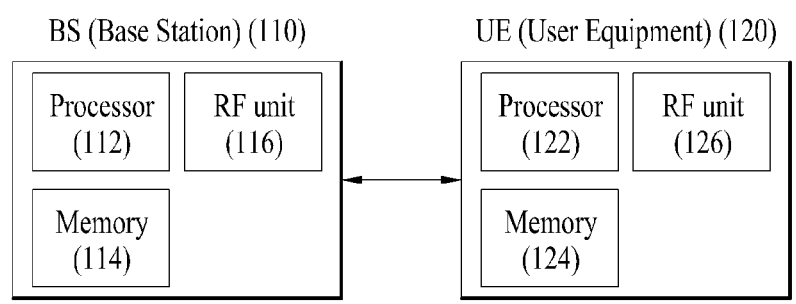
FIG. 10 is a diagram for an example of a base station and a user equipment applicable to the present invention.

FIG. 10 is a diagram for an example of a base station and a user equipment applicable to the present invention.

Referring to FIG. 10, a wireless communication system includes a base station (BS) 110 and a user equipment (UE) 120. If the wireless communication system includes a relay, the BS or the UE can be replaced with the relay.

The base station 110 includes a processor 112, a memory 114, and a RF (radio frequency) unit 116. The processor 112 is configured to implement a function, a procedure and/or a method proposed by the present invention. The memory 114 is connected with the processor 112 and stores various informations associated with operations of the processor 112. The RF unit 116 is connected with the processor 112 and is configured to transmit/receive a radio signal. The user equipment 120 includes a processor 122, a memory 124, and a RF (radio frequency) unit 126. The processor 122 is configured to implement a function, a procedure and/or a method proposed by the present invention. The memory 124 is connected with the processor 122 and stores various informations associated with operations of the processor 122. The RF unit 126 is connected with the processor 122 and is configured to transmit/receive a radio signal.

The above-mentioned embodiments correspond to combinations of elements and features of the present invention in prescribed forms. And, it is able to consider that the respective elements or features are selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

In this disclosure, a specific operation explained as performed by a base station may be performed by an upper node of the base station in some cases. In particular, in a network constructed with a plurality of network nodes including a base station, it is apparent that various operations performed for communication with a terminal can be performed by a base station or other networks except the base station. Moreover, in this document, 'base station (BS)' may be substituted with such a terminology as a fixed station, a Node B, an eNode B (eNB), an access point (AP) and the like. And, 'terminal' may be substituted with such a terminology as a user equipment (UE), a mobile station (MS), a mobile subscriber station (MSS) and the like.

Embodiments of the present invention can be implemented using various means. For instance, embodiments of the present invention can be implemented using hardware, firmware, software and/or any combinations thereof. In case of the implementation by hardware, a method according to each embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code is stored in a memory unit and is then drivable by a processor. The memory unit is provided within or outside the processor to exchange data with the processor through the means well-known to the public.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents. And, it is apparently understandable that an embodiment is configured by combining claims failing to have relation of explicit citation in the appended claims together or can be included as new claims by amendment after filing an application.

INDUSTRIAL APPLICABILITY

The present invention can be used by such a wireless communication device as a user equipment, a base station and the like.

What is claimed is:

1. A method of receiving a first device-to-device (D2D) signal for a D2D communication between a first user equipment and a second user equipment by the second user equipment in a wireless communication system supporting the D2D communication, the method comprising:
receiving D2D discovery signal information including configuration information of the first D2D signal from a base station;
receiving interference signal information including a format indicator from the base station, the format indicator indicating whether configuration information of a second D2D signal is identical to the configuration information of the first D2D signal;
receiving D2D signals including the first D2D signal and the second D2D signal, the first D2D signal received from the first user equipment, and the second D2D signal received from a third user equipment;
reconstructing an interference signal using the interference signal information and the configuration information of the first D2D signal; and
eliminating the reconstructed interference signal from the D2D signals, wherein when the format indicator indicates that the configuration information of the second D2D signal is not identical to the configuration information of the first D2D signal, the interference signal information further comprises parameter information indicating the difference between the configuration information of the second D2D signal and the configuration information of the first D2D signal, and the interference signal is reconstructed using the parameter information and the configuration information of the first D2D signal.

2. The method of claim 1, wherein when a control signal or a data signal except the first D2D signal is not received in a subframe in which the first D2D signal is received, the first D2D signal is used as a discovery signal for the D2D communication.

3. The method of claim 1, wherein the D2D signals comprise at least one of a reference signal used for estimating an uplink channel and a reference signal used for demodulating data.

4. The method of claim 1, wherein the configuration information or the parameter information includes at least one of bandwidth information, a sequence group number, a base sequence number, a cyclic shift, an antenna port and frequency hopping information.

5. The method of claim 1, wherein the interference signal information is received via radio resource control (RRC) signaling or a physical downlink control channel (PDCCH).

6. The method of claim 5, wherein when the interference signal information is received via the PDCCH, the interference signal information is received via a field indicating a modulation and coding scheme among a downlink control information (DCI) format.

7. The method of claim 1, further comprising calculating and transmitting a signal to interference plus noise ratio (SINR) value of the first D2D signal to the base station,
wherein when the SINR value is greater than a specific value, the base station does not transmit the interference signal information.

8. A second user equipment receiving a first D2D signal for device-to-device (D2D) communication between a first user equipment and the second user equipment in a wireless communication system supporting D2D communication, comprising:
a transceiver; and
a processor that controls the transceiver to:
receive D2D discovery signal information including configuration information of the first D2D signal from a base station,
receive interference signal information including a format indicator from the base station, the format indicator indicating whether configuration information of the second D2D signal is identical to the configuration information of the first D2D signal, and
receive D2D signals including the first D2D signal and the second D2D signal, the first D2D signal received from the first user equipment, and the second D2D signal received from a third user equipment, wherein the processor further:

reconstructs an interference signal using the interference signal information and the configuration information of the first D2D signal, and eliminates the reconstructed interference signal from the D2D signals, wherein when the format indicator indicates that the configuration information of the second D2D signal is not identical to the configuration information of the first D2D signal, the interference signal information further comprises parameter information indicating the difference between the configuration information of the second D2D signal and the configuration information of the first D2D signal, and the interference signal is reconstructed using the parameter information and the configuration information of the first D2D signal.

9. The user equipment of claim 8, wherein when a control signal or a data signal except the first D2D signal is not received in a subframe in which the first D2D signal is received, the first D2D signal is used as a discovery signal for the D2D communication.

10. The user equipment of claim 8, wherein the D2D signals comprises at least one of a reference signal used for estimating an uplink channel and a reference signal used for demodulating data.

11. The user equipment of claim 8, wherein the configuration information or the parameter information includes at least one of bandwidth information, a sequence group number, a base sequence number, a cyclic shift, an antenna port and frequency hopping information.

12. The user equipment of claim 8, wherein the interference signal information is received via radio resource control (RRC) signaling or a physical downlink control channel (PDCCH).

13. The user equipment of claim 12, wherein when the interference signal information is received via the PDCCH, the interference signal information is received via a field indicating a modulation and coding scheme among a downlink control information (DCI) format.

14. The user equipment of claim 8, wherein the processor is further configured to calculate and transmit a signal to interference plus noise ratio (SINR) value of the first D2D signal to the base station, wherein when the SINR value is greater than a specific value, the base station does not transmit the interference signal information.

\* \* \* \* \*